Patented June 30, 1942

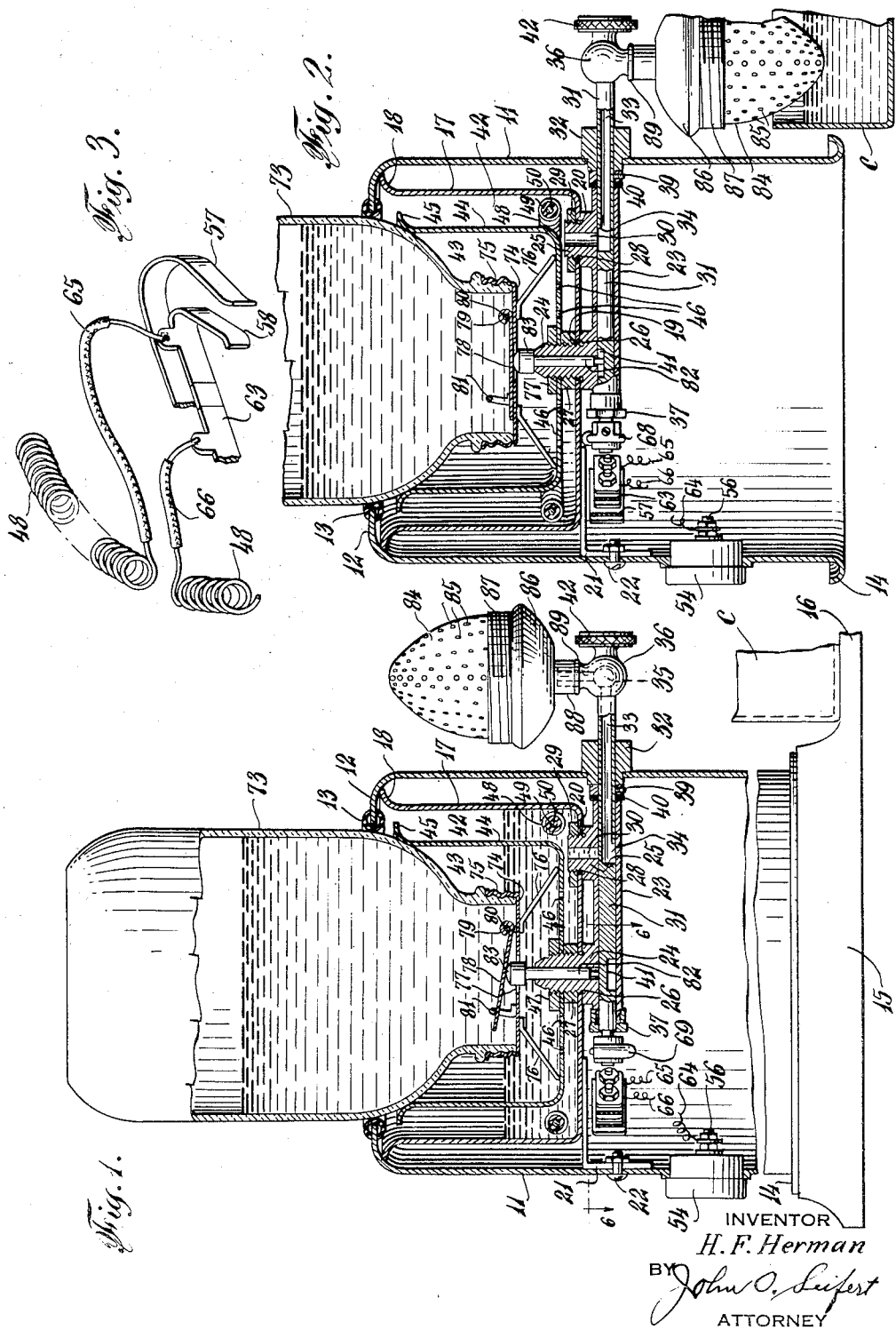

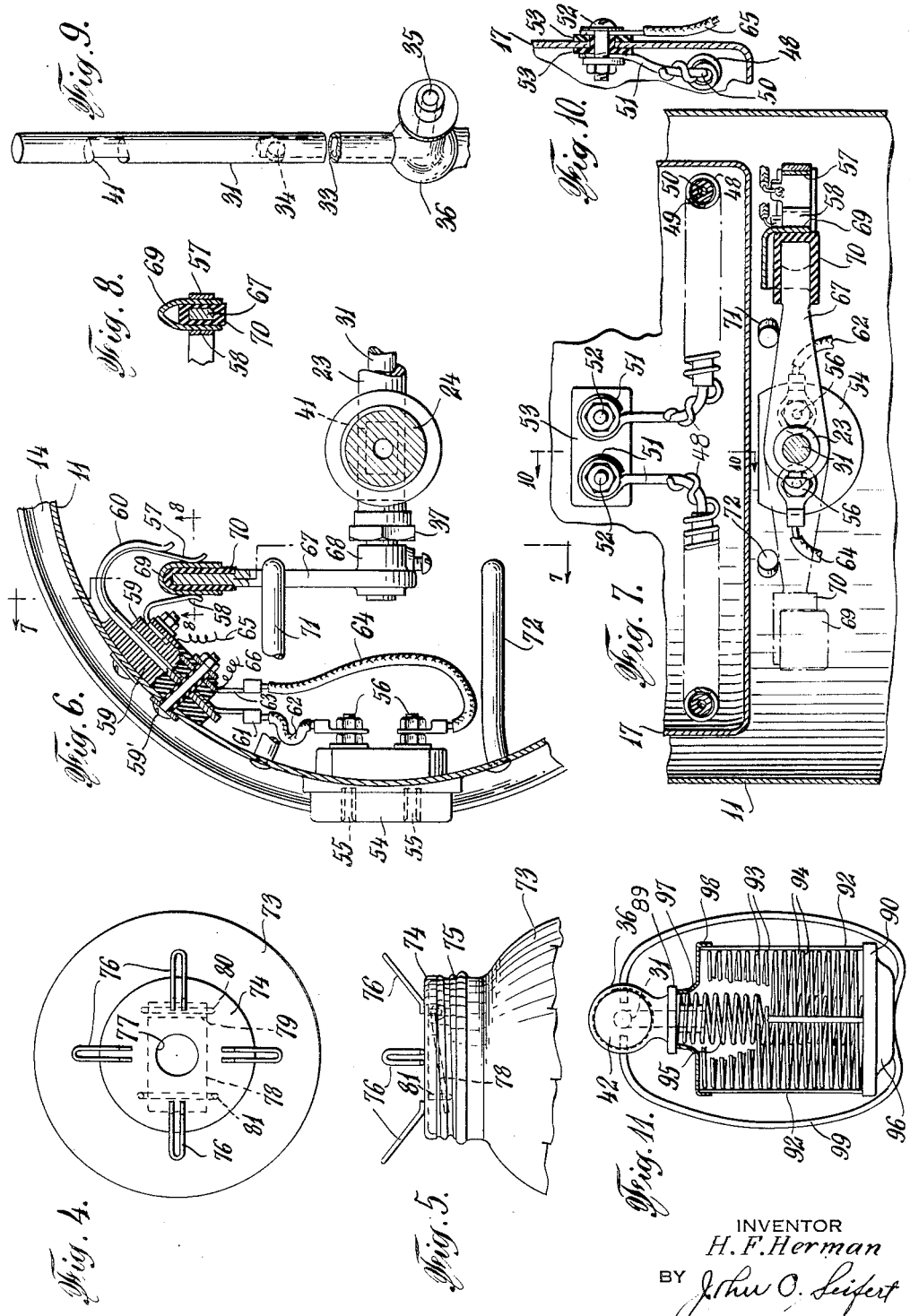

2,288,240

UNITED STATES PATENT OFFICE 2,288,240

BEVERAGE MAKING DEVICE

Henry F. Herman, Rye, N. Y.

Application January 17, 1941, Serial No. 374,843

17 Claims. (Cl. 219—44)

This invention relates to water heaters, and it is an object of the invention to provide an improved water heater including heating means, a water supply receptacle and means operative to effect delivery of water from said receptacle to the heating means in successive substantially equal quantities and the heating and discharge of heated water from the heating means.

It is an another object of the invention to provide an improved water heater including a water heating receptacle, means for heating water in said receptacle, a water supply receptacle, and means for controlling the delivery of water from the water supply receptacle into the water heating receptacle, and the heating and discharge of the water from the water heating receptacle, said means being operative in one position to render the heating means inactive and the delivery of a predetermined quantity of water from the water supply receptacle into the water heating receptacle and in another position thereof shut off the delivery of water from the water supply receptacle into the water heating receptacle and render the heating means active to heat water in and discharge heated water from the water heating receptacle.

It is another object of the invention to provide an improved water heater including a water heating receptacle having a discharge outlet, means for heating water in said receptacle, a water supply receptacle having an outlet from below the level of the liquid therein and a closure for controlling said outlet automatically assuming outlet closing position and said receptacle disposed with the portion having the outlet in the water heating receptacle, valve means for controlling the discharge outlet of the water heating receptacle, and means operative by said valve means when actuated to close said discharge outlet of the water heating receptacle to render the heating means inactive and actuate the closure for the outlet of the water supply receptacle to outlet opening position and delivery of a quantity of water from the water supply receptacle into the water heating receptacle determined by the level of the water in the water heating receptacle, and operative when actuated to open the discharge outlet of the water heating receptacle to permit the closure for the outlet of the water supply receptacle to assume outlet closing position and render the heating means active to heat the water delivered into the water heating receptacle.

A further object of the invention is to provide in a water heater of this character including a water heating receptacle having a discharge outlet, a water supply receptacle having an outlet with a valve to control said outlet and delivery of water into the water heating receptacle and automatically assuming position to close the outlet, and valve means to control the discharge outlet of the water heating receptacle and effect operation of the valve for the outlet and delivery of water from the water supply receptacle into the water heating receptacle, an electric heating element disposed in and adapted to be quenched by the water in the water heating receptacle to heat the water and having a switch interposed in the circuit thereof actuated when the valve means for the discharge outlet of the water heating receptacle is operated to open said discharge outlet to close the circuit of the electric heating element, and the switch actuated to open the circuit of the electric heating element when the valve means for the discharge outlet of the water heating receptacle is operated to close said discharge outlet.

It is another object of the invention to provide an improved water heater particularly adapted for use in making beverages, such as a coffee, tea or cocoa infusion.

In coffee making devices a container is provided for the coffee infusion or decoction, and a foraminous holder or basket to contain ground coffee is arranged at the open end of the container through which heated water is caused to percolate into the container. In some instances a water container having a foraminous or perforated bottom is superposed to the coffee basket into which heated water is filled, the water flowing through the perforated bottom of said container onto and percolates through the ground coffee in the basket into the container from which the coffee infusion is usually poured or drawn in successive cupfuls. In all instances a large quantity of water is required to be heated preparatory to making the coffee infusion or decoction.

It is a further object of the invention to provide an electric water heater of this character adapted for use in making a coffee infusion including a water supply receptacle having a valve controlled outlet adapted to automatically assume outlet closing position, a water heating receptacle having a discharge outlet adapted to receive water from the water supply receptacle, an electric heating element for heating the water in the water heating receptacle having a switch interposed in the circuit thereof, means for actuating the valve for the outlet of the water supply receptacle to control the delivery of water from said receptacle in successive substantially equal quantities, and valve means to control the discharge outlet of the water heating receptacle having a perforated receptacle adapted to contain ground coffee connected thereto, and said valve means being operative when actuated to close the discharge outlet of the water heating receptacle to actuate the valve for the outlet of and discharge a predetermined quantity of water from the water supply receptacle controlled by the level of the water in the water heating receptacle and actuate the switch to open the circuit of the electric heating element, and when actuated to open said discharge outlet permit the valve for the outlet of the water supply receptacle to close said outlet and actuate the switch to close the circuit of the electric heating element and heat the water in and discharge the heated water from the water heating receptacle into the coffee containing receptacle to percolate through the coffee therein.

It is another object of the invention to provide liquid dispensing means for delivering liquid from a receptacle in successive substantially equal quantities.

Other objects and advantages of the invention will hereinafter appear.

In the drawings accompanying and forming a part of this application,

Figure 1 is an elevational view of the device forming the embodiment of the invention partly in section to show the arrangement of parts for delivering a measured quantity of water from a supply receptacle into a water heating receptacle and retaining said quantity of water in the heating receptacle without heating the same.

Figure 2 is a view similar to Figure 1 showing arrangement of parts for delivering heated water from the heating receptacle into a receptacle or cartridge for coffee or tea while shutting off communication between the water supply receptacle and the heating receptacle.

Figure 3 is a fragmentary perspective view of the connection between an electric heating element and switch mechanism.

Figures 4 and 5 are a bottom view and elevational view, respectively, of a valve controlled and supporting end of the water supply receptacle.

Figure 6 is a sectional view, on an enlarged scale, taken on the line 6—6 of Figure 1 looking in the direction of the arrows, and showing the electric switch mechanism for controlling the circuit of the electric heating element in circuit closing position.

Figure 7 is a sectional view taken on the line 7—7 of Figure 6 looking in the direction of the arrows and showing in full lines the circuit closing position of the switch mechanism and circuit opening position in dot and dash lines.

Figure 8 is a sectional view taken on the line 8—8 of Figure 6 looking in the direction of the arrows to show the structure of a contact maker of the switch mechanism.

Figure 9 is a perspective view of valve means for controlling a discharge outlet of the water heating receptacle and actuating a valve for an outlet of the water supply receptacle to outlet opening position and for carrying and actuating the contact maker of the switch mechanism.

Figure 10 is a fragmentary sectional view taken on the line 10—10 of Figure 7 looking in the direction of the arrows and showing a terminal connection between the heating element and switch mechanism.

Figure 11 is an elevational view of a modified form of cartridge for coffee or tea adapted to be mounted on a discharge portion of the valve means for the discharge outlet of the water heating receptacle and partly broken away to show a spiral water delivering member within the cartridge.

In carrying out the embodiment of the invention illustrated in the accompanying drawings, there is provided a tubular housing 11 of dielectric material, such as glass or vitro-enamel, having at one end an inwardly extending annular flange 12 arranged with a tubular sealing and buffer member 13 of resilient material, such as rubber, engaged on the edge of said flange. The opposite end or bottom of the housing is curled outwardly and upwardly to form a channel 14 adapted to be engaged on a suitable supporting base member 15 having a laterally extending portion 16 for supporting a cup C or the like for a purpose to be hereinafter described. A receptacle 17 of dielectric material, such as glass or vitro-enamel, and of cup shape with the rim at the open end flaring outwardly, as shown at 18, and having a center opening 19 and an opening 20 adjacent to the side wall in the bottom thereof is adapted for heating liquid, such as water, therein. The depth and diameter of the receptacle are less than the depth and diameter of the housing 11 and the receptacle is mounted in the housing by an angle bracket 21 fixed by one leg portion to the interior of the housing 11 by a screw or bolt, as shown at 22, and the other leg portion extending below and engaging the bottom of the receptacle 17. The bracket 21 is mounted on the housing to position the receptacle 17 with the outwardly flaring rim 18 in engagement with an arcuate portion at the juncture of the side wall and flange 12 of the housing 11 to prevent liquid escaping from the receptacle into the housing. The receptacle 17 is formed with a discharge outlet and further supported from the housing 11 by a tubular member 23 of a length greater than the radius of the receptacle and having a pair of laterally extending bosses 24, 25 disposed in alinement with each other and spaced longitudinally of the tubular member, the boss 24 being adjacent one end of the tubular member and of greater length than the boss 25 and adapted to extend through the opening 19 centrally in the bottom of the receptacle 17. The boss 24 is arranged with an annular shoulder adjacent to the tubular member 23 to abut the exterior of the bottom of the receptacle 17 and said shoulder having an annular recess in the face thereof adjacent to the body of the boss for the engagement of packing material, as shown at 26, to prevent leakage of water from the receptacle 17 through the opening 19. The boss 24 is secured in the opening 19 with the packing material impinged against the bottom of the receptacle about the opening by a nut engaged on screw threads on the portion of the boss 24 extending through the opening 19 and into the receptacle 17, as shown at 27. The other boss 25 is adjacent to the opposite end of the tubular member 23 to extend through the opening 20 in the bottom of the receptacle 17 and has an annular shoulder adjacent to the tubular member to engage the exterior of the bottom of the receptacle and arranged with an annular recess for packing material to seal the opening 20, as shown at 28. The boss 25 is provided with a screw thread and is of a length to extend into the receptacle 17 a distance sufficient for the threaded engagement of a nut thereon, as shown at 29, for securing the boss in the opening 20. The boss 24 has a bore or opening extended therethrough adapted for the slidable mounting of an actuating member therein to be hereinafter described. The boss 25 has an opening therethrough constituting a discharge outlet or port 30 for the receptacle 17. The discharge outlet is controlled and the receptacle 17 is further supported from the housing 11 by valve means comprising a rod 31 of greater length than the tubular member 23 rotatably mounted in said tubular member and a bushing 32 fixed in an opening in the side wall of the housing 11 in horizontal alinement with the bore in the tubular member 23. The end portion of the valve rod 31 extending from the outlet port 30 and through the bushing 32 is arranged with a longitudinal bore or passage 33, the inner end of which opens through the side of the rod to be positioned into and out of register with the outlet port 30 in boss 25, as shown at 34 in Figures 1 and 2, and the outer end of the passage communicating with an angular passage 35 in a nozzle 36 fixed on the outer end of the valve rod 31 extending exteriorly from the bushing 32. The opposite end of the valve rod 31 is solid and extends through a stuffing-box 37 at the end of the tubular member 23 to prevent leakage of water from said end of the tubular member. To prevent longitudinal movement of the valve rod, a collar is mounted on the valve rod between the tubular member 23 and the bushing 32 and releasably secured to the valve rod by a set screw, as shown at 39, and the collar is adapted to hold a washer 40 of packing material against the adjacent end of the tubular member to seal said end of the tubular member. A recess 41 is arranged in the side of the valve rod through which inlet 34 opens so that the recess 41 will be positioned in communication with the bore in the boss 24 when the opening 34 is in register with the discharge outlet 30. The discharge outlet 30 is open when the valve rod 31 is rotated to position the opening 34 in register with the port 30 and the outlet of the nozzle 36 extends in a downward direction, as shown in Figure 2, and the outlet port 30 is closed when the rod is rotated to position the opening 34 out of register with the outlet port and the outlet of the nozzle extends in an upward direction, as shown in Figure 1. To facilitate the rotation of the valve rod, a knurled knob 42 is arranged on a lateral extension of the nozzle.

The receptacle 17 is arranged with an annular U shaped chamber 42 and a cup shaped chamber 43 concentrically of the chamber 42 by a cup shaped receptacle 44 of dielectric material, such as glass or vitro-enamel, said receptacle being of smaller dimensions than the receptacle 17 and has the rim of the open end flared outwardly, as at 45, and the bottom arranged with a series of perforations 46. The receptacle 44 is mounted in the receptacle 17 with the perforated bottom of the receptacle 44 spaced above the bottom of the receptacle 17 and the flaring open end 45 below and within the flaring open end 18 of the receptacle 17 by engaging the boss 24 in an opening centrally in the bottom of the receptacle 44 with said bottom resting on the nut 27 and secured in said position by a nut 47 threaded onto the boss at the inner side of the receptacle bottom. The level of the liquid to be heated will be the same in both of the chambers 42 and 43 due to the perforations 46 in the bottom of the receptacle 44. The liquid in the chamber 42 is heated by heating means submersed therein, and shown as an electric heating element comprising an electric resistance wire 48 coiled around a tubular member 49 composed of a series of curved pieces of insulating material, such as porcelain or vulcanite, engaged in abutting relation to each other on a support of relatively stiff wire 50 of electric conducting material extending in an arc of a circle having a diameter intermediate the diameters of the receptacles 17 and 44 and the end portions of said wire bent at right angles to extend in parallel relation to each other with the ends of said end portions curled to form circular eyelets, as shown at 51 in Figures 7 and 10, and each eyelet engaged on and secured to the inner end of a terminal 52 mounted in spaced relation to the other terminal 52 in the side wall of the receptacle 17 and electrically insulated therefrom, as shown at 53 in Figure 10. One end of the resistance wire 48 is wound around and secured in contact with one of the bent ends 51 of the wire 50 and the other end of the resistance wire 48 wound around and secured in contact with the other bent end 51, so that the opposite ends of the resistance wire are electrically connected to the terminals 52. The heating means is positioned in horizontal alinement with the perforated bottom of the receptacle 44 and a portion of said heating means adjacent to the discharge outlet 30 to facilitate instantaneous heating of the water delivered from the chamber 42 in the receptacle 17 through said discharge outlet. The electric resistance wire 48 is electrically connected to a source of electricity through an electric outlet receptacle 54 of usual construction having blade contacts 55 (Figure 6) for removable connection with blade contacts of a connection plug of an electric conductor cord connected to a source of electricity, not shown, and the outlet receptacle mounted in the wall of the housing 11 with the blade contacts 55 exposed exteriorly of the housing and a pair of terminals 56 connected to the contacts 55 and exposed to the interior of the housing. The outlet receptacle 54 is connected to the electric resistance wire 48 through switch mechanism comprising a pair of contact members or blades 57, 58 of electric conducting and resilient material having straight portions mounted on the side wall of the housing 11 by a pair of blocks 59 of electric insulating material, one block being interposed between the blade 57 and the housing wall and the other block between the blades, as shown in Figure 6, and the blades and blocks clamped to the housing by bolts 59'. The blade 57 is of greater length than the other blade 58 and maintained in spaced relation with the other blade 58 by an arcuate end of a plate 60 of relatively stiff material juxtaposed to the blade 57 and clamped between said blade and the block adjacent to the housing. The free end of the straight portion of the blade 57 is arranged with a terminal 61 connected by an electric conductor 62 to one of the terminals 56 of the outlet receptacle 54. The free end of the straight portion of the blade 58 is spaced and insulated from a terminal member 63 clamped to the outer insulating block 59 and connected by an electric conductor 64 to the other terminal 56 of the outlet receptacle 54. The blade 58 is electrically connected to the outer end of one of the terminals 52 on the receptacle 17 by an electric conductor 65 and the terminal member 63 is electrically connected to the outer end of the other terminal 52 on the receptacle 17 by an electric conductor 66, whereby the circuit of the electric resistance wire 48 is normally open and the electric resistance wire deenergized, and the circuit is adapted to be closed and the electric resistance wire energized by electrically bridging or connecting the blades 57, 58 by the actuation of the valve rod 31 to open the discharge outlet 30. This is accomplished by a contact maker carried by the valve rod and comprising an arm 67 having at one end a boss 68 fixed on the end of the valve rod projecting from the inner end of the tubular member 23 and the opposite end of the arm arranged with a clip or cap 69 of electric conducting material electrically insulated from the arm by a sleeve 70 of electric insulating material, as shown in Figures 6, 7 and 8, the cap 69 being of sufficient width to contact the blades 57 and 58 when positioned between said blades. The arm 67 is positioned on the valve rod 31, so that the arm will abut a stop 71 fixed in the side wall of and projecting into the housing 11 and engage the conductor cap 69 between and in engagement with the blades 57 and 58 when the valve rod is actuated to position the opening 34 in communication with the discharge outlet 30, as shown in Figures 2 and 6 and in full lines in Figure 7, and when the valve rod is actuated to position the opening 34 out of communication with the discharge outlet 30, as shown in Figure 1, the arm 67 abuts a stop 72 fixed in a side wall of and projecting into the housing 11 with the conductor cap 69 out of engagement with the blades 57, 58, as shown in dot and dash lines in Figure 7.

In the present embodiment of the invention, it is desired to heat and deliver from the receptacle 17 liquid in successive substantially equal quantities, such as successive quantities of water to fill successive coffee cups. This is accomplished by delivering to said receptacle 17, including the receptacle 44, a quantity of liquid to fill a coffee cup, while the discharge outlet 30 is closed, by suitable means, such as a receptacle 73, preferably of transparent material, such as glass, containing a supply of liquid and having one end closed and the opposite end open and closed by a removable cap 74 having screw threads on the skirt portion engaging screw threads on the open end of the receptacle 73, as shown at 75, and having a series of leg portions 76 fixed to and extending obliquely from the exterior of the base of the cap to engage and support the receptacle 73 from the bottom of the receptacle 44 with the cap spaced from and parallel to said bottom. The end of the receptacle 73 formed by the cap 74 is arranged with an outlet controlled by the actuation of the valve rod 31 and comprising an opening 77 in the center of the cap 74 and a flap valve in the form of a plate 78 having one end curled over to form an eyelet 79 about the connecting portion of a U shaped rod 80 having the opposite ends fixed to the interior of the base of the cap 74 to pivotally mount the valve at one end and permit the opposite end of the valve to have movement toward and away from the opening 77, the movement of the valve plate from the opening permitting the flow of liquid from the receptacle 73 to the receptacle 44 and being limited by a stop in the form of a U member 81 having the leg portions fixed to the interior of the cap 74 and the connecting portion spaced above the free end of the valve plate 78. The valve plate 78 normally assumes outlet closing position by gravity and the pressure of the liquid in the receptacle 73 and is actuated to outlet opening position by the actuation of the valve rod 31 to close the discharge outlet 30. This is accomplished by a pin 82 slidable in the bore of the boss 24 and having a head 83 at the upper end to abut the valve plate 78 and the lower end of reduced diameter to abut the circumference of the valve rod 31 in the discharge outlet closing position of said rod, as shown in Figure 1, and engage the recess 41 in the valve rod in the discharge outlet opening position of said rod, as shown in Figure 2. The abutment of the circumference of the valve rod with the pin 82 will move said pin through the outlet 77 and lift the valve plate 78 to outlet opening position against the stop 81, and the engagement of the reduced end of the pin 82 in the recess 41 in the valve rod 31 will permit the pin 82 to move out of the outlet 77 and the valve plate 78 to close said outlet.

In the inoperative condition of the device, the valve rod 31 is actuated to position the nozzle 36 to extend in an upward direction, the opening 34 out of register with the discharge outlet 30 and the contact maker 69 out of engagement with the blades 57, 58, and the pin raised by the periphery of the valve rod to lift the valve plate 78 to outlet opening position, whereby the liquid will flow from the receptacle 73 into the receptacles 44 and 17 through the outlet 77 and perforations 46 until the level of the liquid in the receptacles 44 and 17 is slightly above the bottom 74 of the receptacle 73 when the flow of liquid is stopped by the equalization of pressure in the receptacle 73 and the pressure in the receptacles 17, 44. The upper portions of the receptacles 17 and 44 are sealed by a circumferential portion of the receptacle 73 engaging the resilient buffer 13 of the housing 11 and a lower circumferential portion of said receptacle engaging the flaring open end 45 of the receptacle 44. In the operative condition of the device, the valve rod is actuated to position the nozzle 36 to extend in a downward direction, the opening 34 in register with the discharge outlet 30 to open communication between said nozzle and outlet and the contact maker 69 in engagement with the blades 57, 58 to close the circuit of the electric resistance wire 48 and heat the water in the chamber 42 and flowing through the discharge outlet 30, and simultaneously permit the pin 82 to drop into the recess 41 in the valve rod 31 and the valve plate 78 to assume outlet closing position, as shown in Figure 2. The quantity of liquid in the chambers 42, 43 is sufficient to fill the cup C positioned below the downwardly extending nozzle 36, and to fill another cup it is necessary to turn the nozzle to extend in an upward direction whereby the outlet port 30 is closed, the electric heating element is rendered inactive, and the valve plate 78 is actuated to open the outlet 77 and permit delivery of a cup full of liquid from the receptacle 73 into the receptacles 44 and 17, and then turn the nozzle to extend in a downward direction to deliver heated liquid to said other cup. The quantity of liquid delivered from the receptacle 73 to the receptacles 17 and 44 may be varied by varying the space between the bottom 74 of the receptacle 73 and the bottom of the receptacle 44 by changing the angle of inclination of the legs 76.

The device is adapted for use in making a coffee or tea infusion by applying a cartridge or receptacle containing ground coffee beans or tea leaves and shown in Figures 1 and 2 as comprising a shell or ball 84 closed at one end and open at the opposite end and arranged with a series of perforations 85 in the wall thereof and screw threads on the exterior at the open end for the releasable engagement of screw threads on the skirt portion of a cap member 86, said releasable engagement being shown at 87 and said cap member 86 having a neck 88 in the crown thereof for removable engagement on the discharge portion of the nozzle 36, said discharge portion having an annular shoulder 89 to limit the engagement of the neck on the discharge portion. The position of the cartridge will indicate whether the outlet port 30 is open or closed, the closed end of the cartridge extending in an upward direction indicating that the outlet port is closed and the closed end of the cartridge extending in a downward direction indicating that the outlet port is open.

In Figure 11, there is shown a modified form of cartridge comprising a cage member composed of a bottom disk 90 having an upwardly extending flange at the periphery and a series of spaced posts 92 fixed at one end to said flange and adapted to support a spirally wound wire 93 forming a series of spaces 94 for the discharge of the coffee or tea infusion. The heated water delivered from the nozzle 36 is discharged laterally into the cage by a tubular member 95 formed of a spirally wound wire having one end engaged and secured in a circular depression 96 in the bottom disk 90 and the opposite end of the tubular member extending into a flanged opening 97 in the center of a cap member 98 engaged on the open end of the cage. In the use of the cartridge shown in Figure 11, the cap member 98 is removed to permit the filling of the cage with ground coffee beans or tea leaves around the tubular member 95, then the cap member 98 is engaged on the open end of the cage, and the flanged opening 97 of the cap member 98 of the assembled cartridge is engaged on the discharge portion of the nozzle 36 and the assembled cartridge is releasably retained on the nozzle by a bail member 99 pivotally mounted on the nozzle and adapted to be engaged under the bottom disk 90. When the heated water is delivered from the nozzle, it will flow into the tubular member 95 and from said member through the spaces between the wire coils laterally through the coffee or tea in the cage to infuse said coffee or tea and the resulting infusion flowing laterally through the spaces 94 in the cage. The area of lateral flow of the heated water through the tubular member 95 will progressively rise in said member corresponding to the area of saturation of the coffee or tea, that is, the area of coffee or tea surrounding the portion of the tubular member 95 from which the heated water is flowing will become saturated and retard or restrict the flow of the heated water therethrough and cause the heated water to flow through the portion of the coffee or tea above the saturated portion, whereby the entire mass of coffee or tea in the cage will be thoroughly infused.

The supply of water to the chambers 42, 43 from the receptacle 73 may be supplemented by connecting the receptacle 73 to a water main through a hose entering the closed end of said receptacle. In the present embodiment of the invention, the receptacle 73 may be readily removed from the housing 11 and the receptacle 44 through the flanged opening 12 and the flaring open end 45, and filled with liquid by removing the cap 74 from the open end of the receptacle 73.

Having thus described my invention, I claim:

1. In a water heater, a receptacle for water to be heated having an outlet, means for heating water in said receptacle, a water supply receptacle having an outlet opening through the bottom to within the water heating receptacle, a valve for controlling the outlet of and discharge of water from the water supply receptacle adapted to automatically assume outlet closing position, and means operative to control the heating means and opening and closing of the outlet of the water heating receptacle, said means being operative when actuated to outlet closing position to actuate the valve for the outlet of the water supply receptacle to outlet opening position and permit delivery of a quantity of water from the water supply receptacle into the water heating receptacle determined by the level of water in the water heating receptacle and render the heating means inactive to heat water in the water heating receptacle, and when actuated to outlet opening position the valve for the outlet of the water supply receptacle automatically assuming position to close said outlet and shut off delivery of water from the water supply receptacle and render the heating means active to heat water in the water heating receptacle.

2. In a water heater, a water supply receptacle having an outlet from below the level of the water, a valve for controlling the outlet of said receptacle adapted to automatically assume outlet closing position, a second receptacle having an outlet and in which receptacle the water supply receptacle is disposed with the outlet of the water supply receptacle disposed within and spaced above the bottom of said second receptacle, heating means to heat water in the second receptacle, valve means to control the outlet of and the discharge of water from the second receptacle, and means operative by the actuation of said valve means to close the outlet of the second receptacle to actuate the valve for the outlet of the water supply receptacle to open said latter outlet and permit the delivery of a quantity of water from the water supply receptacle into the second receptacle controlled by the level of the water in said latter receptacle and render the heating means inactive to heat water in the second receptacle, and operative by the actuation of said valve means to open the outlet of the second receptacle to permit the valve for the outlet of the water supply receptacle to automatically assume outlet closing position and render the heating means active to heat water in the second receptacle.

3. In a liquid dispensing device, a liquid supply receptacle having an outlet opening to the receptacle from the lowermost portion of the liquid therein, a valve for the outlet of said receptacle normally assuming outlet closing position, a second receptacle having an outlet and in which receptacle the liquid supply receptacle is disposed with the outlet disposed in and spaced a predetermined distance above the bottom of the second receptacle, valve means to control the outlet of and discharge of liquid from the second receptacle, and means operative by the actuation of said valve means to close the outlet of the second receptacle to actuate the valve for the outlet of the liquid supply receptacle to and retain it in outlet opening position for delivery of a quantity of liquid from the liquid supply receptacle into the second receptacle controlled by the level of the liquid delivered into said latter receptacle and said means assuming a position to permit the valve for the outlet of the liquid supply receptacle to automatically assume outlet closing position when said valve means is actuated to open the outlet of the second receptacle.

4. In a liquid heater, a liquid container including a pair of cup members arranged in nested spaced relation, the outer cup member having an outlet through the bottom and the inner cup member communicating through openings in the bottom with the outer cup member, an electric heating element in the outer cup member adapted to be immersed in the liquid therein, heating means in the annular U chamber, a liquid supply receptacle having an outlet at one end and supported by the liquid container with the outlet end disposed in the inner cup member thereof, a valve for controlling the outlet of the liquid supply receptacle and adapted to automatically assume outlet closing position, and means operative to control the heating element and the opening and closing of the outlet of the liquid container, said means being operative when actuated to outlet closing position to actuate the valve for the outlet of the liquid supply receptacle to outlet opening position and permit delivery of a quantity of liquid from the liquid supply receptacle into the liquid container determined by the level of the liquid therein and render the heating element inactive to heat the liquid in the liquid container and when actuated to outlet opening position operative to permit the valve for the outlet of the liquid supply receptacle to automatically assume position to close said outlet and shut off delivery of liquid from the liquid supply receptacle and render the heating element active to heat the liquid in the liquid container.

5. In an infusion device, a receptacle for water to be heated having an outlet, an electric heating coil in said receptacle for heating water therein, a water supply receptacle having an outlet opening in a portion adapted to be disposed in the water heating receptacle, a valve for controlling said outlet opening and discharge of water from the water supply receptacle and adapted to automatically assume outlet closing position, valve means having a discharge portion and arranged with means to open and close the circuit of the heating means and the opening and closing of the outlet of the water heating receptacle to the discharge portion of said valve means, and operative when actuated to close the outlet of the water heating receptacle from the discharge portion of said valve means to actuate the first valve to outlet opening position and permit delivery of a quantity of water from the water supply receptacle into the water heating receptacle determined by the level of the water in the water heating receptacle and open the circuit of the heating coil and when actuated to open the outlet of the water heating receptacle to the discharge portion of the valve means permit the first valve to automatically close the outlet of the water supply receptacle and shut off delivery of water from the water supply receptacle and close the circuit to heat water in the water heating receptacle, and a perforated container for the material to be infused by heated water releasably mounted on the discharge portion of the valve means to receive heated water from the water heating receptacle when the valve means is actuated to open the outlet of the water heating receptacle to the discharge portion of the valve means.

6. An infusion device as claimed in claim 5, wherein the valve means comprises a rod rotatably supported by the water heating receptacle and having a hollow end portion arranged with a nozzle at the end of said portion and opening laterally through the rod intermediate the ends of the rod, said lateral opening being adapted to be placed into and out of register with the outlet of the water heating receptacle by the rotation of the rod and the opposite end portion of the rod arranged to actuate the heating means and the valve for the outlet of the water supply receptacle, and the perforated container adapted to be releasably mounted on the nozzle of the rod.

7. An infusion device as claimed in claim 5, wherein the perforated container comprises a cage member closed at one end and the opposite end having a center opening arranged for connection in communication with the discharge portion of the valve means and the side wall having a vertical series of horizontal slots, and a tubular member fixed to and closed at one end by the closed end of the cage member and the opposite end communicating with the center opening in the opposite end of the cage member and the side wall arranged with a series of horizontal slots.

8. In a liquid dispensing device, a liquid supply receptacle having an outlet in the bottom, a valve for controlling the outlet of said receptacle adapted to automatically assume outlet closing position, a second receptacle having an outlet and in which receptacle the liquid supply receptacle is disposed with the outlet spaced above the bottom of said second receptacle, a member mounted in the bottom of the second receptacle to have vertical sliding movement adapted to engage and move the valve for the outlet of the liquid supply receptacle to outlet opening position and normally assuming a position out of engagement with said valve, and valve means to control the outlet and the discharge of liquid from the second receptacle and arranged to actuate the slidable member to position the valve for the outlet of the liquid supply receptacle into outlet opening position when said valve means is actuated to close the outlet of the second receptacle and permit said slidable member to assume normal position out of engagement with the valve when the valve means is actuated to open the outlet of the second receptacle.

9. A liquid dispensing device as claimed in claim 8, wherein the valve for the outlet of the liquid supply receptacle comprises a flap valve pivotally mounted on one side of said outlet, and the movable means comprises a pin slidable in the bottom of the second receptacle.

10. In a liquid dispensing device as claimed in claim 8, a tubular member having tubular bosses extending laterally therefrom and secured in the bottom of the second receptacle in communication therewith, one of said bosses forming the outlet of the second receptacle and the second boss extending in vertical alinement with the outlet of the liquid supply receptacle, the slidable member comprising a pin slidable in the second boss, and the valve means for the outlet of the second receptacle comprising a rod rotatable in the tubular member having a passage extended longitudinally into one end and the opposite end terminating in an opening through an intermediate side portion of the rod in vertical alinement with the outlet of the second receptacle and a transverse recess in a side portion of the rod in alinement with the second boss to permit movement of the pin away from the valve for the outlet of the liquid supply receptacle when the opening of the passage in the side of the rod is in register with the outlet of the second receptacle.

11. In a water heater, a water supply receptacle having a flat bottom arranged with an outlet, a valve for controlling the outlet of the water supply receptacle adapted to automatically assume outlet closing position, a second receptacle having an outlet and in which receptacle the water supply receptacle is disposed with the outlet of the water supply receptacle spaced above the bottom of the second receptacle, an electric heating element in the second receptacle, switch mechanism mounted exteriorly of the receptacles and connected in the electric circuit of the heating element, means movably mounted in the bottom of the second receptacle and adapted to engage and move the valve for the outlet of the water supply receptacle to outlet opening position and normally assuming a position out of engagement with said valve to permit said valve to assume outlet closing position, and valve means to control the outlet of the second receptacle and arranged to actuate the switch mechanism to open the circuit of the heating element and actuate the movable means to move the valve for the outlet of the water supply receptacle to outlet opening position when actuated to close the outlet of the second receptacle and actuate the switch mechanism to close the circuit of the heating element to heat the water in the second receptacle and permit the movable means to assume normal position out of engagement with the valve for the outlet of the water supply receptacle and said valve to assume outlet closing position when actuated to open the outlet of the second receptacle and permit the delivery of heated water from said second receptacle.

12. A water heater as claimed in claim 11, wherein the switch mechanism comprises a pair of spaced contacts insulated from each other and adapted for connection to a source of electricity and the heating element, and a contact maker carried by the valve means to control the outlet of the second receptacle adapted to engage and bridge the spaced contacts and close the circuit of the heating element when said valve means is actuated to open the outlet of the second receptacle.

13. In a water heater, a housing having a base at one end and the opposite end open, a receptacle having one end open and an outlet in the opposite end mounted in the housing with the open end adjacent to the open end of the housing and the outlet in spaced relation to the base of the housing, electric heating means mounted in the receptacle, a water supply receptacle having an outlet at one end supported to extend through the open ends of the housing and first receptacle with the outlet of the water supply receptacle disposed within and spaced above the outlet end of the first receptacle, a valve for controlling the outlet of the water supply receptacle adapted to automatically assume outlet closing position, and manually operative valve means for the outlet of the first receptacle having a discharge portion extending through the side of the housing and arranged to open the valve for the outlet of the water supply receptacle and render the heating means inactive to heat the water when actuated to close the outlet of the first receptacle and to permit the valve for the outlet of the water supply receptacle to assume outlet closing position and render the heating means active to heat water in the first receptacle when actuated to open the outlet of the first receptacle and deliver heated water through the discharge portion thereof.

14. A water heater as claimed in claim 13, wherein the heating means comprises an electric resistance coil, switch mechanism supported by the housing and connected in the circuit of the electric resistance coil and arranged to normally open said circuit, and the valve means for the outlet of the first receptacle arranged with means to actuate the switch mechanism to close the circuit of the coil when said valve means is actuated to open the outlet of the first receptacle.

15. A water heater as claimed in claim 13, wherein the discharge portion of the valve means terminates exteriorly of the housing and is arranged for the releasable mounting of a cartridge containing a beverage making substance.

16. In a liquid dispensing device, a housing having a base at one end and the opposite end open and arranged with an inwardly extending flange, a receptacle having one end open and an outlet in the opposite end and supported by and within the housing with the open end of the receptacle abutting the flange and the opening in said open end concentric of the opening in the open end of the housing, a second receptacle having one end open and perforation in the opposite end and supported centrally by and within the first receptacle with the walls of the second receptacle spaced from the walls of the first receptacle and the open end of the second receptacle terminating within the open end of the first receptacle, a liquid supply receptacle having an outlet in one end and supported by the second receptacle with the outlet in space relation to the perforated end of said second receptacle and the side wall engaging the open ends of the housing and second receptacle, a valve for the outlet of the liquid supply receptacle adapted to automatically assume outlet closing position, and valve means rotatably supported by the housing and first receptacle and having a discharge portion extending exteriorly of the housing adapted to be positioned by the rotation of the valve means into and out of communication with the outlet of the first receptacle to control the delivery of liquid from the first receptacle and said valve means being arranged to actuate the valve for the outlet of the liquid supply receptacle to outlet opening position when actuated to close the outlet of the first receptacle from the discharge portion of said valve means and to permit the valve for the outlet of the liquid supply receptacle to assume outlet closing position when said valve means is actuated to open communication between the outlet of the first receptacle and the discharge portion of the valve means.

17. In a liquid dispensing device as claimed in claim 16, an electric heating coil mounted in the first receptacle adjacent to the outlet of said receptacle and adapted to be immersed in the liquid therein, and switch mechanism supported by the housing and connected in the circuit of the heating coil adapted to open the circuit of the coil by the actuation of the valve means to close the outlet of the first receptacle and close said circuit by the actuation of the valve means to open said outlet to the discharge portion of the valve means.

HENRY F. HERMAN.